(12) United States Patent
Zuravleff

(10) Patent No.: US 6,650,138 B2
(45) Date of Patent: Nov. 18, 2003

(54) DISPLAY DEVICE TEST PROCEDURE AND APPARATUS

(75) Inventor: William K. Zuravleff, Mountain View, CA (US)

(73) Assignee: Aurora Systems, Inc., San Jose, CA (US)

( * ) Notice: Subject to any disclaimer, the term of this patent is extended or adjusted under 35 U.S.C. 154(b) by 207 days.

(21) Appl. No.: 09/935,537

(22) Filed: Aug. 22, 2001

(65) Prior Publication Data

US 2003/0038651 A1 Feb. 27, 2003

(51) Int. Cl.[7] .......................... G01R 31/00; G02F 1/136; G09G 5/00
(52) U.S. Cl. .......................... 324/770; 349/48; 345/205
(58) Field of Search .......................... 349/1, 5, 33, 37, 349/41, 48, 54; 324/500, 770; 345/204, 205, 206, 30, 32, 55; 438/17, 18

(56) References Cited

U.S. PATENT DOCUMENTS 6,005,558 A * 12/1999 Hudson et al. ............. 345/204

OTHER PUBLICATIONS

H. C. Huang et al., "Integrated Digital Input Driver for Active Matrix Liquid–Crystal–On–Silicon Display", 1995 IEEE.*

Blalock, et al. *True Color 1024 × 768 Microdisplay with Analog In–Pixel Pulsewidth Modulation and Retinal Averaging Offset Correction*. IEEE Journal of Solid–State Circuits, vol. 36, No. 5, May 2001, pp. 838–845.

* cited by examiner

*Primary Examiner*—Evan Pert
(74) *Attorney, Agent, or Firm*—Henneman & Saunders; Larry E. Henneman, Jr.

(57) ABSTRACT

A test method (80) for testing a reflective LCD array (10) and apparatus including a mirror read pass transistor (45). In the reflective LCD array (10) has a plurality of system cells (36), wherein data is written to a mirror (33). A measurement device (76) which, in one embodiment is a mirror read pass transistor (45) allows read back of voltage on the mirror (33), thereby providing a measurable criteria for determining if the mirror (33) a mirror electrical contact (43) and associated driving circuitry such as a master cell (40), a slave cell (41) and an analog mux (42) are properly connected and functioning.

26 Claims, 6 Drawing Sheets

DISPLAY DEVICE TEST PROCEDURE AND APPARATUS

TECHNICAL FIELD

The present invention relates to the field of electronic imaging devices, and more particularly to a means and method for testing essential components of liquid crystal on silicon ("LCOS") imaging devices. The predominant current usage of the present inventive improved testability method and apparatus is in the production of reflective liquid crystal display ("LCD") imaging devices, wherein the early detection of defective silicon components would be most desirable.

BACKGROUND ART

A known type of LCOS display utilizes pixel mirrors to project images. These mirrors act as electrodes to modulate reflected light. These pixel mirrors contain an electrical contact that is connected to a data source, such as an analog multiplexer ("mux"). During the manufacturing process production errors can occur such that one or more of the mirrors might not achieve a good electrical contact, resulting in an unconnected mirror. Currently, pixel mirrors are inspected at final completion visually. When unconnected mirrors are detected the entire assembly is discarded.

Ideally, unconnected mirrors would be detected before they proceed through the entire liquid crystal assembly. This would save the effort and expense of finishing the processing of such assemblies, and would significantly decrease the average overall cost of the production of such devices. It would also be advantageous to have a method or means to test the electrical properties of the LCOS display by some less labor-intensive method than the visual inspection method now common in the art. However, to the inventor's knowledge, no such method or means has existed in the prior art. Current practice is to rely on visual inspection utilizing different test patterns to make sure every cell is working properly.

Aside from the problem of improper electrical connections, there also exists a possibility of other problems occurring during the wafer manufacturing process in which the logic of the integrated circuitry might become corrupted. Such defects also result in the entire assembly being discarded. This makes finding a method or means for detecting errors before these defective imaging devices complete the entire liquid crystal assembly even more desirable. However, to the inventor's knowledge no method or means has existed in the prior art to easily and reliably detect such defects.

SUMMARY

It is an object of the present invention to provide a method for electrically detecting unconnected mirrors of LCOS imaging devices.

It is another object of the present invention to provide a method and apparatus for testing the internal logic of an LCOS imaging device.

It is still another object of the present invention to provide a method and apparatus for reducing the cost of production of LCOS imaging devices.

It is yet another object of the present invention to provide a method and apparatus for producing high quality LCOS imaging devices.

It is yet another object of the present invention to provide a method and apparatus wherein unconnected mirrors in an LCOS imaging device can be detected before they proceed through liquid crystal assembly, thereby allowing the mirror to be discarded before resources are used unnecessarily.

It is still another object of the present invention to provide a method and apparatus that allows for detection of unconnected mirrors before the entire liquid crystal assembly of an LCOS imaging device is completed.

It is yet another object of the present invention to provide a method and apparatus for easily detecting electrical faults in an LCOS imaging device.

Briefly, the present invention introduces a single transistor (a mirror read pass transistor) into the driver circuitry of an imaging device, for the purpose of detecting unconnected pixel mirrors. According to the present invention, the pixel mirror has two electrical contacts, one connected to the output of an analog mux and the other to a mirror read pass transistor. The placement and configuration of the mirror read pass transistor allows for the reading of the mirror voltage electronically, thus allowing for the detection of unconnected mirrors. The introduction of the mirror read pass transistor also provides a method and means for detecting electrical faults in electrical driver circuitry, such as a slave cell and an analog mux cell.

These and other objects and advantages of the present invention will become clear to those skilled in the art in view of the description of modes of carrying out the invention, and the industrial applicability thereof, as described herein and as illustrated in the several figures of the drawing. The objects and advantages listed are not an exhaustive list of all possible advantages of the invention. Moreover, it will be possible to practice the invention even where one or more of the intended objects and/or advantages might be absent or not required in the application.

Further, those skilled in the art will recognize that various embodiments of the present invention may achieve one or more, but not necessarily all, of the above described objects and advantages. Accordingly, the listed advantages are not essential elements of the present invention, and should not be construed as limitations.

DETAILED DESCRIPTION

Figure 1:
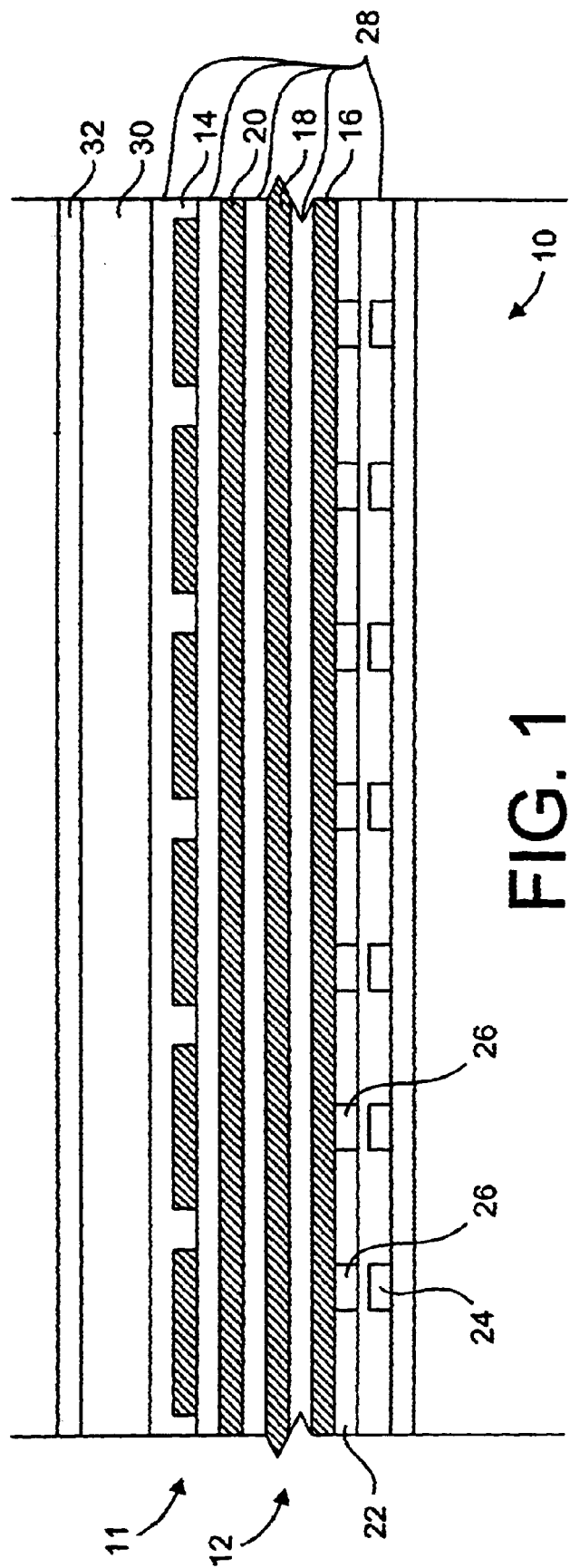
FIG. 1 is a diagrammatic (not to scale), side elevational view of a reflective LCOS array.

A known mode for carrying out the invention is a unique reflective LCD array. A portion of the inventive reflective LCD array is depicted in a diagrammatic (not to scale), side elevational view in FIG. 1, and is designated therein by the general reference character 10. The reflective LCD array 10 has an integrated chip ("IC") portion 11, which includes a plurality of material layers 12. The embodiment discussed by way of example herein has a mirror layer 14, a first metal (M1) layer 16, a second metal (M2) layer 18, and a third metal (M3) layer 20. In the present example also are a polysilicon (recrystallized silicon) layer 22 and a diffusion layer 24. One skilled in the art will recognize that areas where traces on the poly layer 22 mask those of the diffusion layer 24 are semiconductor junctions 26. Also visible in the view of FIG. 1 are a plurality of silicon dioxide insulating layers 28. After the IC portion 11 is created, a liquid crystal layer 30 and an ITO layer 32 are added thereto. One skilled in the art will recognize that the ITO layer 32 and the mirror layer 14 provide the electrical poles for polarizing the liquid crystal layer 30 therebetween. Further, one skilled in the art will recognize that the IC portion 11 receives display information from a data source (not shown) and controls the assertion of the display data onto the mirror layer 14.

According to the present invention, the IC portion 11 contains additional circuitry, as compared to the prior art, as will be discussed in further detail hereinafter. This additional circuitry allows the display data to be read back from the mirror layer 14, which provides for electrical testing of the reflective LCD array 10.

Figure 2:
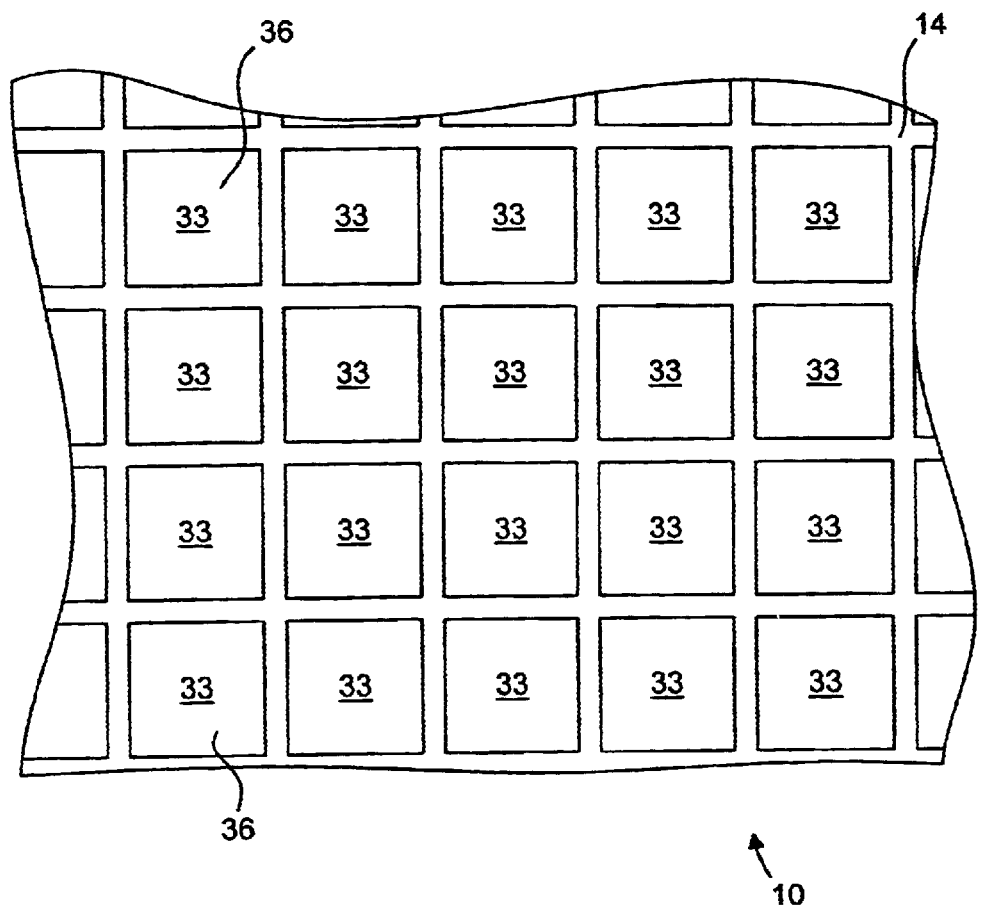
FIG. 2 is a top perspective (not to scale) view of the reflective surface of the LCOS array of FIG. 1.

FIG. 2 is a diagrammatic top plan view of a portion of the reflective LCD array 10 of FIG. 1, showing the layout of a plurality of mirrors 33 thereon. The mirrors 33 are in the mirror layer 14 (FIG. 1), previously discussed herein in relation to FIG. 1, and can be viewed through the protective insulating layer 28, the liquid crystal layer 30 and the ITO layer 32 which are over the mirror layer 14. Each of the mirrors will have associated circuitry in the integrated chip portion 11, as will be discussed in greater detail hereinafter. Each of the mirrors 33 and circuitry associated therewith (not visible in the view of FIG. 2) will be referred to herein as a system cell 36. Each of the system cells 36 contains portions of both the IC layer 11 and the mirror layer 14. The layout of the system cells 36 is well know to those skilled in the art.

Figure 3:
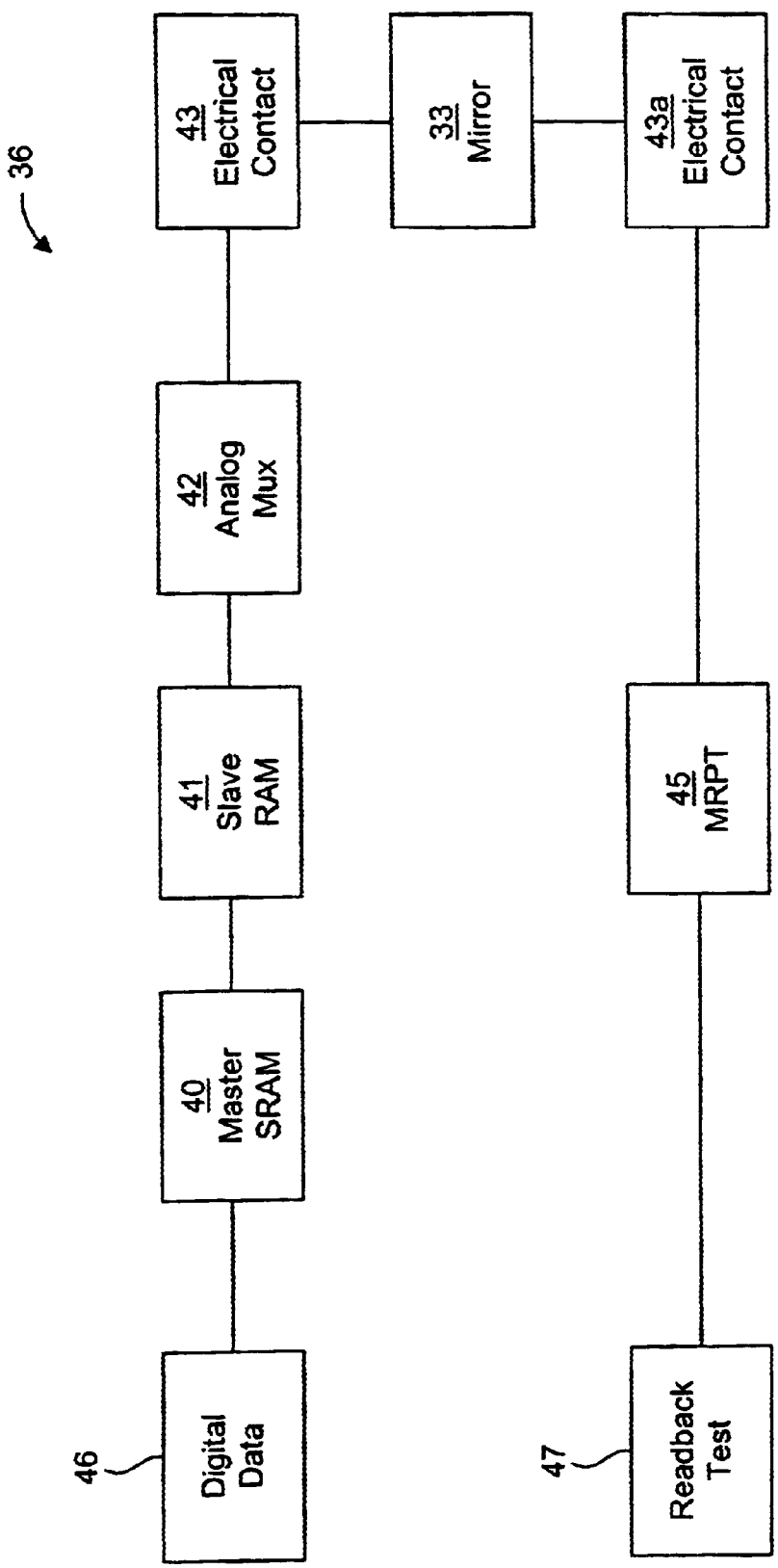
FIG. 3 is a block diagram representing components that are included in the integrated circuitry of the present invention.

FIG. 3 is a block diagram depicting the individual components of one of the system cells 36. The system cell 36 has a number components as follows: A master memory cell 40 and a slave memory cell 41 are similar to those of a conventional SRAM cell. The master cell 40 receives, stores, and provides the stored display data to the slave cell 41, while slave cell 41 latches and displays the previously provided display data. In a process known to those skilled in the art as "shuttering" the display data is transferred from the master cell 40 to the slave cell 41. In the presently described embodiment 10 of the invention, responsive to the output of slave cell 41, an analog mux 42 asserts one of two selected voltages $V_0$ or $V_1$ on the associated mirror 33, through an electrical contact 43. The analog mux 42 allows for optimization of voltages provided to the mirror 33, since optimal mirror 33 operating voltages may not be the optimal operating voltage of the associated driver circuitry. According to the present invention, the mirror 33 has an additional electrical contact 43a for connection to a mirror read pass transistor ("MRPT") 45.

As shown in the diagrammatic view of FIG. 3, the master cell 40 receives data from a digital data circuitry 46. The digital data circuitry 46 is conventional in nature, and is not a unique aspect of this present invention. As can also be seen in the view of FIG. 3, the MRPT 45 is read by a read back test circuit 47. As will be discussed in greater detail hereinafter, in the embodiment of the invention specifically described herein the digital data circuitry 46 and the read back test circuit 47 share a common data line to the digital control circuitry of the reflective LCD array 10. One skilled in the art will be readily familiar with such a circuit for, upon command, reading the status of the MRPT 45, thereby determining the status of charge on the mirror 33 according to the present inventive method, as will be discussed in more detail hereinafter.

The addition of the additional electrical contact 43a to the mirror 33 and the MRPT 45 allows for a method of testing that has a high degree of fault coverage that can determine errors in logic as well as detect unconnected mirrors 33. This can be done before the assembly proceeds through the entire liquid crystal process allowing defective devices to be discarded before resources are wasted.

Figure 4:
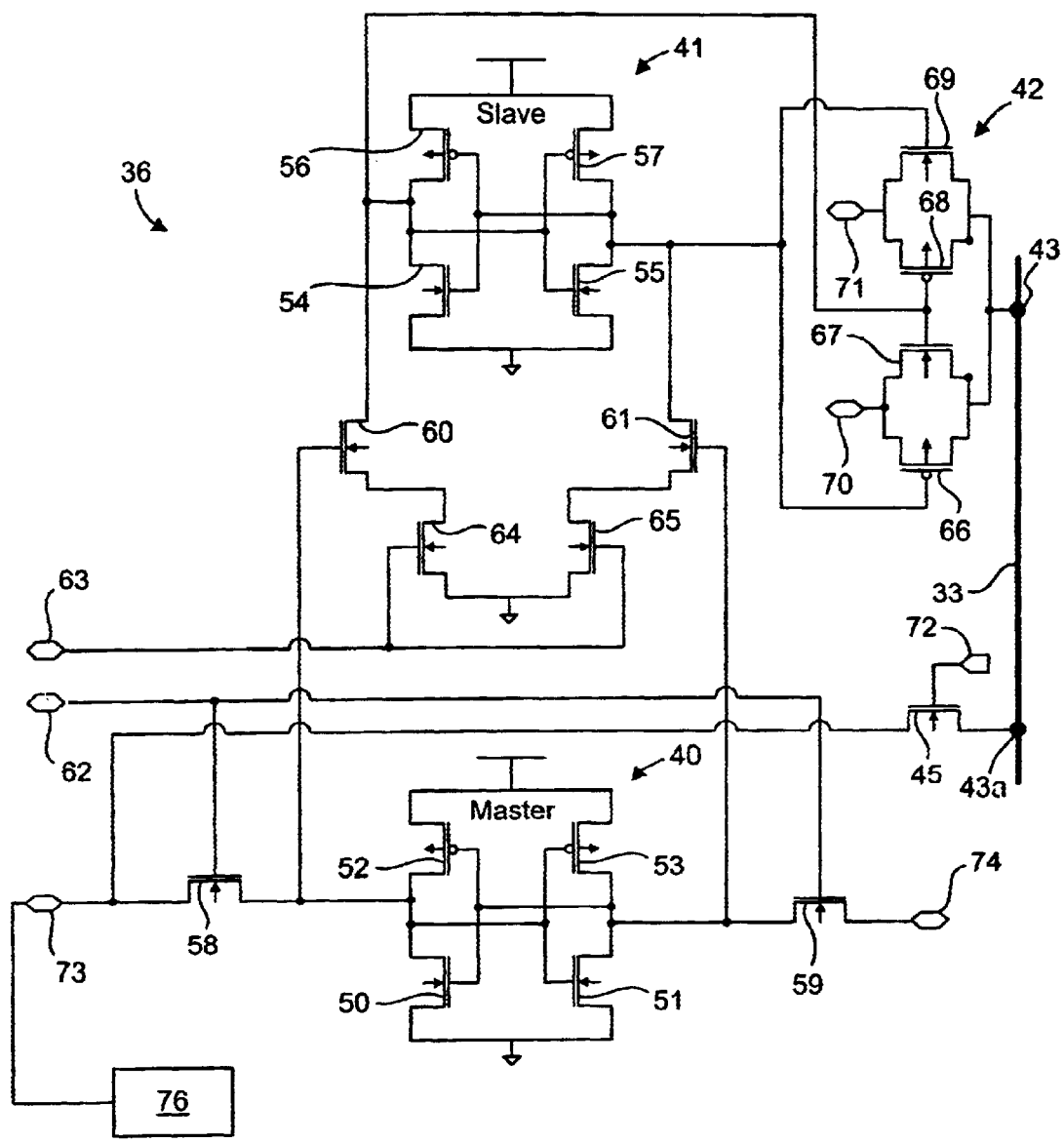
FIG. 4 is a more detailed schematic representation of the components of FIG. 3.

FIG. 4 is a more detailed schematic drawing of the system cell 36. A particular means of realizing the present invention utilizes two bits of data storage accomplished by the master 40 and slave 41 SRAM cells. Transistors 50, 51, 52, and 53 are combined to form a standard latch, well known to those skilled in the art, which is the master cell 40. Transistors 54, 55, 56, and 57 are, similarly, combined to implement a standard latch to form the slave cell 41.

Pass gates to allow access to external data are formed by a transistor 58 and a transistor 59 for the master cell 40, and by a transistor 60 and a transistor 61 for the slave cell 41. External data is provided to the master cell 40 when a word line ("wl") 62 is high, and data is transferred from the master cell 40 to the slave cell 41 when a word line slave ("wls") 63 is high. The wls 63 is coupled to the pass gate transistors 60 and 61 through transistors 64 and 65. Those skilled in the art will recognize that the transistors 64 and 65 are somewhat redundant. While either transistor 64 or 65 would perform the desired function individually, both are provided for symmetry in IC design.

In the presently described embodiment of the invention, the analog mux 42 is formed from transistors 66, 67, 68 and 69, as can be seen in the view of FIG. 4. As previously discussed herein, the analog mux 42 accepts data from the slave cell 41, and outputs a voltage corresponding to a selected one of inputs $V_0$ 70 or $V_1$ 71.

In the view of FIG. 4 can be seen a diagrammatic representation of the mirror 33 of the system cell 36, and the conventional prior art contact 43 through which data is transferred from the analog mux 42 to the mirror 33. The additional contact 43a provides a path for reading the voltage condition of the mirror 33 through the MRPT 45 when a word line mirror ("wlm") 72 line is asserted. As can be seen in the example of FIG. 4, in this particular embodiment of the invention, the MRPT 45 is read through a data line 73 which is also one of the means for providing data to the master cell 40 therethrough, although this is not an essential element of the invention. One skilled in the art will recognize that a complementary data line 74 is provided for providing complementary data to the master cell 40.

Also shown in the view of FIG. 4 is a measurement device 76, for measuring and comparing the output from the mirror read pass transistor 45 to a preset standard. One skilled in the art will recognize that the measurement device 76 will be easy to implement without undue experimentation, particularly in view of the description of the functionality of measurement device 76 set forth below. In the presently described embodiment of the invention, the measurement device 76 is located external to the reflective LCD array in an external test apparatus. However, it should be recognized that it is within the scope of the invention that the measurement device 76 could also be built into the reflective LCD array 10 for providing a self test capability.

Figure 5:
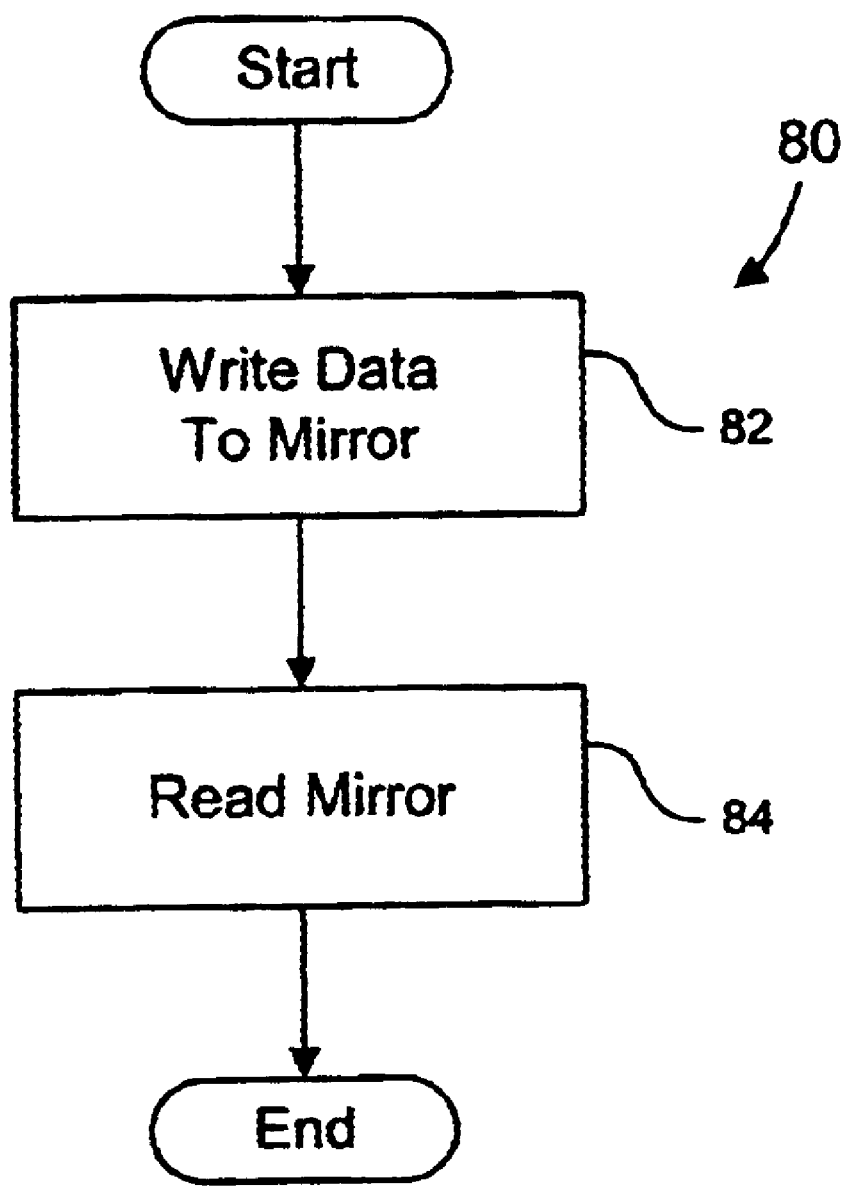
FIG. 5 is a block flow diagram representing a method for testing a reflective LCOS display.

FIG. 5 is a block flow diagram representing a test method 80 for testing the system cell 36 utilizing the MRPT 45. According to the present inventive method, in a write data to mirror operation 82, a voltage is placed on the mirror 33. As previously discussed herein, in the example specifically described in relation to FIGS. 3 and 4, the voltage is placed on the mirror by first providing data to the master cell 40 (FIG. 4), and then transferring the data to the slave cell 41, whereafter a corresponding voltage is asserted on the mirror 33 through the analog mux 42. However, it should be recognized that the particular method and means for providing the voltage to the mirror 33 is not an essential aspect of the present invention. According to the present inventive method 80, following the placing of the voltage on the mirror 33 in the write data to mirror operation 82, the voltage present at the MRPT 45 is read in a read mirror operation 84. As has been previously discussed herein, the MRPT 45 is read when the wlm 72 causes the MRPT to conduct the potential on the mirror 33 to the measurement circuitry 76. In light of the above discussion, one skilled in the art will recognize that reading the condition of the mirror 84 in the read mirror operation 84 will provide information about whether or not a voltage has been properly placed on the mirror 33, and whether such voltage is within acceptable limits. If there is no voltage on the mirror 33 after such a voltage should have been provided in the write data to mirror operation 82, or if such voltage is not within predetermined acceptable limits, then this indicates a fault either in the mirror 33, one or both of the electrical contacts 43 or 43a, or the circuitry provided for placing the voltage on the mirror. In any of these cases, the reflective LCD array 10 can be rejected before the liquid crystal 30 and ITO 32 layers, and other additional portions of the reflective LCD array 10 are added.

It is desirable to repeat steps 82 and 84 of method 80, with the inverse of the first test data written. For example, if the first data written to system cell 36 causes voltage $V_0$ to be asserted on mirror 33, then the inverse test data would cause voltage $V_1$ to be asserted on mirror 33. Repeating test method 80 with inverse data facilitates the detection of electrical shorts that would cause mirror 33 to be held at some constant voltage. For example, if data causing voltage $V_1$ to be asserted on mirror 33 was written to system cell 36, then a mirror 33 shorted to the $V_1$ supply line would pass the read test, and the defect would go undetected. However, if data causing voltage $V_0$ to be asserted on the same mirror 33 was then written to system cell 36, the value $V_1$ (resulting from the short) read from mirror 33 would reveal the defect.

One skilled in the art will recognize that the method for testing 80 described above describes the testing of a single system cell 36 (FIG. 3). As described above, the reflective LCD array 10 has a large plurality of such system cells 36. Therefore, it will be necessary or desirable to repeat the method for testing 80 for each of the system cells 36. According to the capacities of the digital circuitry provided, these tests can be done sequentially or all simultaneously. Alternatively, several iterations of the method for testing 80 can be accomplished simultaneously, with such operation being repeated until all of the system cells 36 are tested.

Various modifications may be made to the invention without altering its value or scope. For example, one skilled in the art will recognize that the circuitry shown and described herein in relation to FIG. 4 is only one of many possible examples of circuitry which might be used to implement the invention.

All of the above are only some of the examples of available embodiments of the present invention. Those skilled in the art will readily observe that numerous other modifications and alterations may be made without departing from the spirit and scope of the invention. Accordingly, the disclosure herein is not intended as limiting and the appended claims are to be interpreted as encompassing the entire scope of the invention.

INDUSTRIAL APPLICABILITY

The inventive improved reflective LCD array 10 and associated method for testing 80 are intended to be widely used in the production of liquid crystal on silicon devices and in particular in the production and testing of reflective LCD arrays, wherein it is highly desirable to accurately test for faults in the product, and also very important to discover faults in the product at an early stage such that production resources will not be wasted on the completion of defective units. According to the present inventive apparatus and method, time is saved in that the testing is accomplished electrically rather than by the prior art labor intensive visual method. Also, the quality of testing is improved, in that the present inventive method is less likely to overlook a defective unit than would a human inspector using the visual method. Finally, the present inventive method and apparatus provides a significant improvement over the prior art in that, not only is the present inventive test method superior to prior art methods in testing a finished product, the present inventive method can be employed at early production stages to detect defective units during the actual production process.

Since the inventive method and apparatus of the present invention may be readily produced using known manufacturing methods and operations, and since the advantages as described herein are provided, it is expected that it will be readily accepted in the industry. For these and other reasons, it is expected that the utility and industrial applicability of the invention will be both significant in scope and long-lasting in duration.

I claim:

1. A wafer based imaging device including a mirror acting as an electrode, said wafer based imaging device comprising:
    a first mirror electrical contact for providing data to the mirror; and
    a second mirror electrical contact for reading data from the mirror.

2. The wafer based imaging device of claim 1, further comprising:
    mirror driver circuitry having a data input terminal for receiving data, and an output coupled to said first mirror contact; and
    a mirror read output terminal coupled to said second mirror contact.

3. The wafer based imaging device of claim 2, further comprising a switch interposed between said second mirror contact and said mirror read output terminal for selectively coupling said mirror with said mirror read output terminal.

4. The wafer based imaging device of claim 3, wherein said switch includes a single transistor.

5. The wafer based imaging device of claim 4, wherein said data input terminal is coupled to said mirror read output terminal.

6. The wafer based imaging device of claim 2, wherein:
    said data input terminal is one of a pair of complementary data input lines; and
    said mirror readout terminal is coupled to said data input terminal.

7. The wafer based imaging device of claim 1, wherein said mirror driver circuitry includes an analog multiplexer responsive to data received via said data input terminal, and operative to assert one of a plurality of predetermined voltages on said mirror.

8. The wafer based imaging device of claim 7, and further including a comparing device for reading the voltage on said mirror via said mirror read output terminal, and for comparing said voltage on said mirror to a voltage corresponding to the value of data previously written to said mirror.

9. The wafer based imaging device of claim 1, and further including a comparing device for reading the voltage on said mirror via said mirror read output terminal, and for comparing said voltage on said mirror to a voltage corresponding to the value of data previously written to said mirror.

10. A method for testing a wafer based imaging device having a mirror acting as an electrode, comprising:
   (a) writing data to the mirror; and
   (b) reading data from the mirror to determine if said data was properly written to the mirror in step (a).

11. The method of claim 10, further comprising:
   (c) writing the inverse of said data to said mirror; and
   (d) reading data from the mirror to determine if said inverse data was properly written to the mirror in step (c).

12. The method of claim 10, wherein:
   said data is written to said mirror via a first mirror electrical contact; and
   said data is read from said mirror via a second mirror electrical contact.

13. The method of claim 12, wherein:
   said step of writing data to said mirror includes selectively coupling said first mirror contact to a data input terminal, and writing said data to said mirror via said data input terminal; and
   said step of reading data from said mirror includes selectively coupling said second mirror contact with said data input terminal, and reading said data from said mirror via said data input terminal.

14. The method of claim 10, wherein:
   step (b) includes reading the status of the mirror through a read back transistor.

15. The method of claim 14, wherein:
   the status of the mirror is the voltage on the mirror.

16. The method of claim 10, wherein:
   step (b) includes comparing the data read from the mirror to a predetermined value corresponding to the data written to the mirror in step (a).

17. The method of claim 10, wherein said step of writing data to a mirror includes providing said data to an analog multiplexer operative to assert one of a plurality of voltages on said mirror depending on the value of said data.

18. An electronically readable medium having code embodied therein for causing an electronic device to perform the steps of the method of claim 10.

19. An electronically readable medium having code embodied therein for causing an electronic device to perform the steps of the method of claim 11.

20. An electronically readable medium having code embodied therein for causing an electronic device to perform the steps of the method of claim 12.

21. An electronically readable medium having code embodied therein for causing an electronic device to perform the steps of the method of claim 13.

22. An electronically readable medium having code embodied therein for causing an electronic device to perform the steps of the method of claim 16.

23. In a reflective LCD imaging device having a mirror acting as an electrode and a first mirror electrical contact for transferring data to the mirror therethrough, an improvement comprising:
   an additional electrical contact on the mirror for reading data from the mirror therethrough.

24. The improvement of claim 23, and further including:
   a read back device for selectively reading a signal from the mirror through said additional electrical contact.

25. The improvement of claim 24, wherein:
   the read back apparatus includes a read back transistor.

26. The improvement of claim 23, and further including:
   comparison means for determining if the mirror has received data.

* * * * *

UNITED STATES PATENT AND TRADEMARK OFFICE
CERTIFICATE OF CORRECTION

Figure 6:
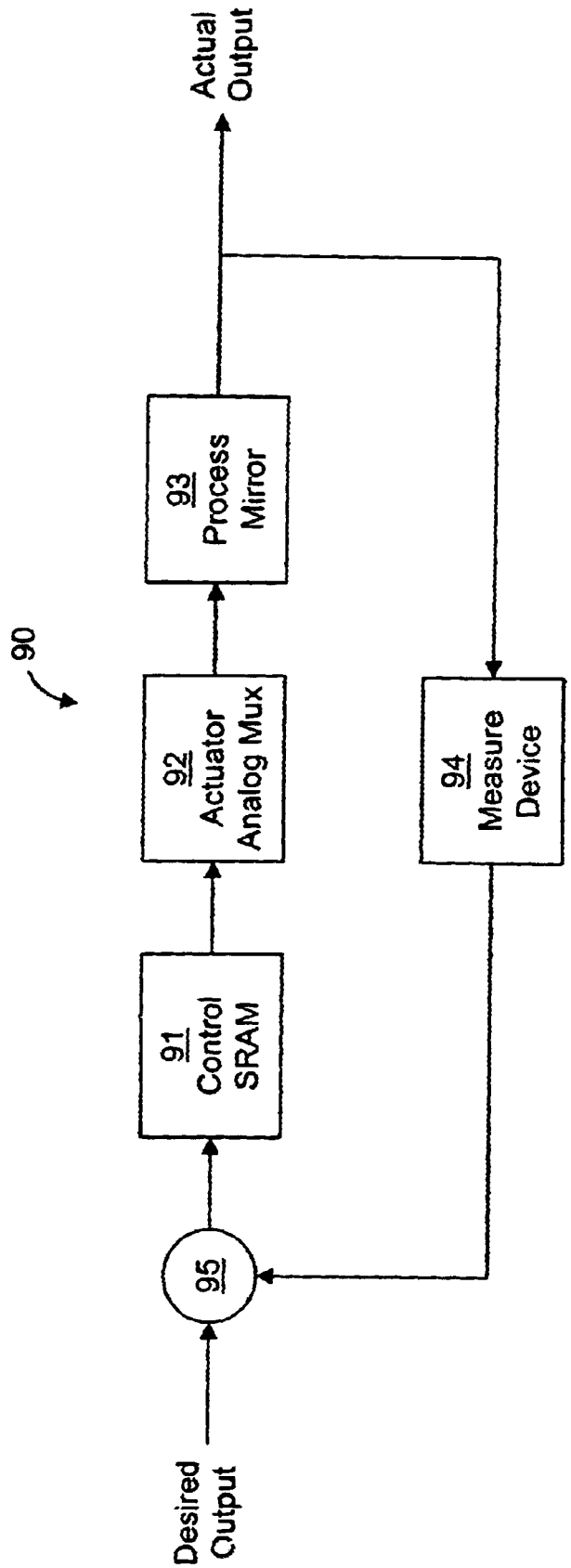

PATENT NO. : 6,650,138 B2  Page 1 of 1
DATED : November 18, 2003
INVENTOR(S) : Zuravleff It is certified that error appears in the above-identified patent and that said Letters Patent is hereby corrected as shown below:

Drawings,
FIG. 6 is deleted.

Signed and Sealed this

Second Day of March, 2004

JON W. DUDAS
*Acting Director of the United States Patent and Trademark Office*